(12) United States Patent
Zhao et al.

(10) Patent No.: US 12,431,715 B2
(45) Date of Patent: Sep. 30, 2025

(54) AUXILIARY POWER SYSTEM CONTROL IN HYBRID POWER PLANTS

(71) Applicant: VESTAS WIND SYSTEMS A/S, Aarhus N. (DK)

(72) Inventors: Chunyang Zhao, Aarhus N (DK); Mu Wei, Solbjerg (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 673 days.

(21) Appl. No.: 17/770,026

(22) PCT Filed: Sep. 14, 2020

(86) PCT No.: PCT/DK2020/050250
§ 371 (c)(1),
(2) Date: Apr. 18, 2022

(87) PCT Pub. No.: WO2021/073700
PCT Pub. Date: Apr. 22, 2021

(65) Prior Publication Data
US 2022/0393477 A1 Dec. 8, 2022

(30) Foreign Application Priority Data
Oct. 16, 2019 (DK) .............. PA2019 70644

(51) Int. Cl.
*G05B 19/042* (2006.01)
*H02J 3/00* (2006.01)
(Continued)

(52) U.S. Cl.
CPC .............. *H02J 3/46* (2013.01); *G05B 19/042* (2013.01); *H02J 3/003* (2020.01); *H02J 3/004* (2020.01);
(Continued)

(58) Field of Classification Search
CPC .... H02J 3/46; H02J 3/003; H02J 3/004; H02J 3/32; H02J 3/381; H02J 7/0048;
(Continued)

(56) References Cited

U.S. PATENT DOCUMENTS

2009/0027932 A1  1/2009 Haines et al.
2009/0230689 A1  9/2009 Burra et al.
(Continued)

FOREIGN PATENT DOCUMENTS

CN   107208608 A    9/2017
DE   102015201431 A1  7/2016
(Continued)

OTHER PUBLICATIONS

China National Intellectual Property Administration, First Office Action for Chinese Patent Application No. 202080074558.8, dated Jun. 28, 2024.
(Continued)

*Primary Examiner* — Yuhui R Pan
(74) *Attorney, Agent, or Firm* — Patterson + Sheridan, LLP; Gero G. McClellan

(57) ABSTRACT

According to embodiments described herein control of the auxiliary power system in a hybrid power plant is provided by determining a grid-draw threshold from an external power grid; monitoring power consumption for powered systems of the hybrid power plant; monitoring power generation of the hybrid power plant; discharging an alternative power source of one or more of an Energy Storage System (ESS) and an auxiliary generator in response to the power consumption exceeding the grid-draw threshold; and implementing prediction algorithms for power generation of the hybrid power plant and the power consumption. Accordingly, a source of power is managed between several alternative sources and the external power grid to meet plant operator defined criteria when maintaining power in various wind speed conditions.

15 Claims, 10 Drawing Sheets

(51) Int. Cl.
| | |
|---|---|
| *H02J 3/32* | (2006.01) |
| *H02J 3/38* | (2006.01) |
| *H02J 3/46* | (2006.01) |
| *H02J 7/00* | (2006.01) |
| *H02J 11/00* | (2006.01) |

(52) U.S. Cl.
CPC ............... *H02J 3/32* (2013.01); *H02J 3/381* (2013.01); *H02J 7/0048* (2020.01); *H02J 7/00712* (2020.01); *H02J 11/00* (2013.01); *G05B 2219/2619* (2013.01); *H02J 2300/28* (2020.01)

(58) Field of Classification Search
CPC .... H02J 7/00712; H02J 11/00; H02J 2300/28; H02J 7/1415; H02J 7/1438; G05B 19/042; G05B 2219/2619; F03D 7/0284; F03D 9/11; Y02E 10/72; Y02E 10/76; Y02E 20/16; Y02E 70/30
See application file for complete search history.

(56) References Cited

U.S. PATENT DOCUMENTS

| | | | | |
|---|---|---|---|---|
| 2011/0040418 A1* | 2/2011 | Kalen | ................... | H01M 10/46 700/291 |
| 2011/0273022 A1 | 11/2011 | Dennis et al. | | |
| 2013/0062953 A1 | 3/2013 | Nurmi et al. | | |
| 2014/0244056 A1 | 8/2014 | Pena et al. | | |
| 2015/0364949 A1* | 12/2015 | Nielsen | ................... | F03D 7/026 307/23 |
| 2017/0192445 A1* | 7/2017 | Dennis | ................... | H02J 3/381 |
| 2018/0075548 A1 | 3/2018 | Madonna et al. | | |

FOREIGN PATENT DOCUMENTS

| | | | |
|---|---|---|---|
| EP | 2397688 | A1 | 12/2011 |
| JP | 2010148336 | A * | 7/2010 |
| KR | 20150005185 | A | 1/2015 |
| WO | 2005017350 | A1 | 2/2005 |
| WO | 2021073700 | A1 | 4/2021 |

OTHER PUBLICATIONS

Danish Patent and Trademark Office, 1st Technical Examination including the Search Report and the Search Opinion for Application PA 2019 70644 dated Apr. 3, 2020.

PCT, Notification of Transmittal of the International Search Report and the Written Opinion of the International Searching Auhority, or the Declaration for Application PCT/DK2020/050250 dated Nov. 23, 2020.

European Patent Office, Communication pursuant to Article 94(3) EPC for European Application No. 20774879.9-1002 on Nov. 28, 2024.

* cited by examiner

AUXILIARY POWER SYSTEM CONTROL IN HYBRID POWER PLANTS

BACKGROUND

Field of the Invention

Embodiments presented in this disclosure generally relate to hybrid wind power plants. Particularly, this disclosure provides control schemes to manage when and how ancillary systems in a hybrid wind power plant are powered by auxiliary generating systems.

Description of the Related Art

Wind turbine generators are an increasing popular source for generating electricity and may be deployed singly or in groups of several wind turbines, often referred to as a wind farm. Within a wind farm, additional power generating and storing systems may be deployed to provide a hybrid wind power plant. These additional power generating and storing systems may include fueled generators, solar panels, chemical batteries, mechanical batteries (e.g., flywheels) or the like, which may be used to provide additional power to the grid or to power ancillary systems in the wind turbines and support systems in the hybrid wind power plant when power generated by the wind turbines is insufficient to meet the needs of those systems. The ancillary systems include various computing devices, sensors, motors, and safety systems (e.g., aircraft warning lights) included in various individual wind turbines. The support systems include various computing devices, sensors, and controllers disposed in the power plant and not associated with an individual wind turbine. Depending on the power needs of the ancillary and supporting systems, and the capacity of the auxiliary generating systems, the hybrid power plant may also draw power from the grid to meet the needs of the ancillary and supporting systems.

SUMMARY

One embodiment of the present disclosure is a hybrid power plant, comprising: a plurality of wind turbine generators, wherein each wind turbine generator includes an ancillary system that consumes power for operation, wherein the power consumption of the hybrid power plant varies over time and includes a peak consumption value; at least one of alternative power source selected from: an Energy Storage System; and an auxiliary generator; a point of common coupling with an external power grid by which power can be injected into the external power grid or drawn from the external power grid by the hybrid power plant; and a controller unit, in communication with the plurality of wind turbine generators, the at least one alternative power source, and the point of common coupling, configured to: determine a power drawn by the hybrid power plant; determine one or more of: a state of charge of the ESS; and an auxiliary generator production capacity; and control the at least one alternative power source to provide additional power to keep the power drawn from the external power grid below a grid-draw threshold, thereby limiting the amount of power drawn from the external power grid at peak consumption.

In another aspect with any hybrid power plant discussed above or below, the at least one alternative power source includes the ESS and the auxiliary generator, and wherein the controller unit is further configured to: control at least one of the ESS and the auxiliary generator to provide additional power based on a preference algorithm, wherein the preference algorithm sets an ESS discharge threshold based on a first level of the power consumption for when to control the ESS to provide additional power, and wherein the preference algorithm sets a generator startup threshold based on a second level of the power consumption for when to start up the auxiliary generator. In some aspects, the startup threshold is set relative to a startup delay of the auxiliary generator.

In another aspect with any hybrid power plant discussed above or below, the at least one alternative power source includes the ESS and the auxiliary generator, and, wherein the controller unit is further configured to control the ESS to charge when at least one of: power generated by the auxiliary generator exceeds the power consumption of the hybrid power plant; and power drawn from the external power grid is below the grid-draw threshold for power drawn from the external power grid.

In another aspect with any hybrid power plant discussed above or below, the at least one alternative power source includes the ESS and the auxiliary generator, and wherein the controller unit is further configured to control the ESS to provide additional power during startup operations of the auxiliary generator and control the ESS to stop providing additional power once the auxiliary generator is active and power output of the auxiliary generator exceeds the power needed to keep the power drawn from the external power grid below the grid-draw threshold.

In another aspect with any hybrid power plant discussed above or below, the controller unit is further configured to control the ESS to maintain the state of charge above a predefined level while the hybrid power plant injects power into the external grid.

In another aspect with any hybrid power plant discussed above or below, the controller unit is further configured to control the auxiliary generator to maintain a minimum fuel level above a predefined level while the hybrid power plant injects power into the external grid.

In another aspect with any hybrid power plant discussed above or below, the grid-draw threshold is set based on a predicted power consumption for the ancillary system.

In another aspect with any hybrid power plant discussed above or below, the grid-draw threshold is determined based on a forecasted power draw from the external grid by the hybrid power plant.

In another aspect with any hybrid power plant discussed above or below, the controller unit is further configured to adjust the grid-draw threshold based on a highest prior experienced peak consumption value measured within a predefined time window.

In another aspect with any hybrid power plant discussed above or below, the controller unit is further configured to minimize a power amount drawn from grid.

One embodiment of the present disclosure is a method for auxiliary power system control in hybrid power plants, the method comprising: determining, for a hybrid power plant, a grid-draw threshold from an external power grid; monitoring power consumption for powered systems of the hybrid power plant; monitoring power generation of the hybrid power plant; discharging an alternative power source of one or more of an Energy Storage System (ESS) and an auxiliary generator in response to the power consumption exceeding the grid-draw threshold; and implementing prediction algorithms for power generation of the hybrid power plant and the power consumption.

In another aspect with any method discussed above or below, the method further comprises adjusting the grid-draw threshold based on a highest peak consumption value measured within a predefined time window.

In another aspect with any method discussed above or below, the method further comprises: resetting the grid-draw threshold to an initial value after the predefined time window; and readjusting the grid-draw threshold based on a subsequent highest peak consumption value measured within a subsequent predefined time window.

In another aspect with any method discussed above or below, controlling the alternative power source is done in further response to a wind generated power level falling below the power consumption.

In another aspect with any method discussed above or below, the method further comprises: in response to reaching a generation threshold, stopping discharge of the alternative power source, wherein the generation threshold includes: a total power supplied from the ESS from an initial state of charge since activation; a total power supplied from the auxiliary generator from an initial fuel level since activation; and a power output from wind turbine generators of the hybrid power plant.

In another aspect with any method discussed above or below, the grid-draw threshold is based on a load sensitivity for a different load connected to the external power grid.

In another aspect with any method discussed above or below, stopping discharge of the alternative power source, further comprises: stopping discharge of the ESS in response to bringing the auxiliary generator online, wherein a power consumption.

One embodiment of the present disclosure is a controller unit for a hybrid power plant, comprising: a processor; and a memory, that stores instructions that when performed by the processor enable the controller unit to perform an operation in response to detecting power consumption for a powered system in the hybrid power plant, the operation comprising balancing discharge from an Energy Storage System, production from an auxiliary generator, and draw from an external power grid for a period of time when wind turbine generators in the hybrid power plant are producing less power than the power consumption for the powered system in the hybrid power plant based on: a state of charge of the Energy Storage System; a production capacity and a startup time of the fueled auxiliary generator; a grid-draw threshold for the external power grid; and a predicted length of time of the period of time.

In another aspect with any controller unit discussed above or below, the grid-draw threshold is based on a load sensitivity for a different load connected to the external power grid.

In another aspect with any controller unit discussed above or below, the grid-draw threshold is adjusted to reflect a highest peak consumption value measured during a measurement cycle and reset to an initial value when the measurement cycle ends. In some aspects, the measurement cycle corresponds to a month, a quarter of a year, or a year.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

When powering auxiliary and support systems in a hybrid power plant from sources other than the wind turbine generators in the hybrid power plant, a plant operator may have different preferences for how to receive the needed power for those systems. In some instances, an operator may desire to rely primarily on power from external sources received over the grid, from auxiliary generators within the hybrid power plant, or from storage devices within the hybrid power plant. These operator preferences may be based on operating overhead for each of the alternative power sources (e.g., one or more of an auxiliary generator and/or an energy storage system), availability and capacity of the alternative power sources, and effects on the grid of using the alternative power sources. For example, if the hybrid power plant draws too much power from the grid, other loads on the grid may experience aberrant effects, but if the hybrid power plant does not draw enough power from the grid, the capacity of the auxiliary power sources may be exhausted before the wind turbines can come back online. Thus, the operator may employ one or more algorithms tuned to the operator's preferences that balance power draw within the hybrid power plant with power draw from outside of the power plant to meet various operational objectives for the hybrid power plant.

As used herein, "draw" refers to power supplied from a source to a consuming system, whereas "demand" refers to power needed by a consuming system. Accordingly, a consuming system may draw power to meet a demand, and that power can be drawn from several different sources.

EXAMPLE EMBODIMENTS

Figure 1:
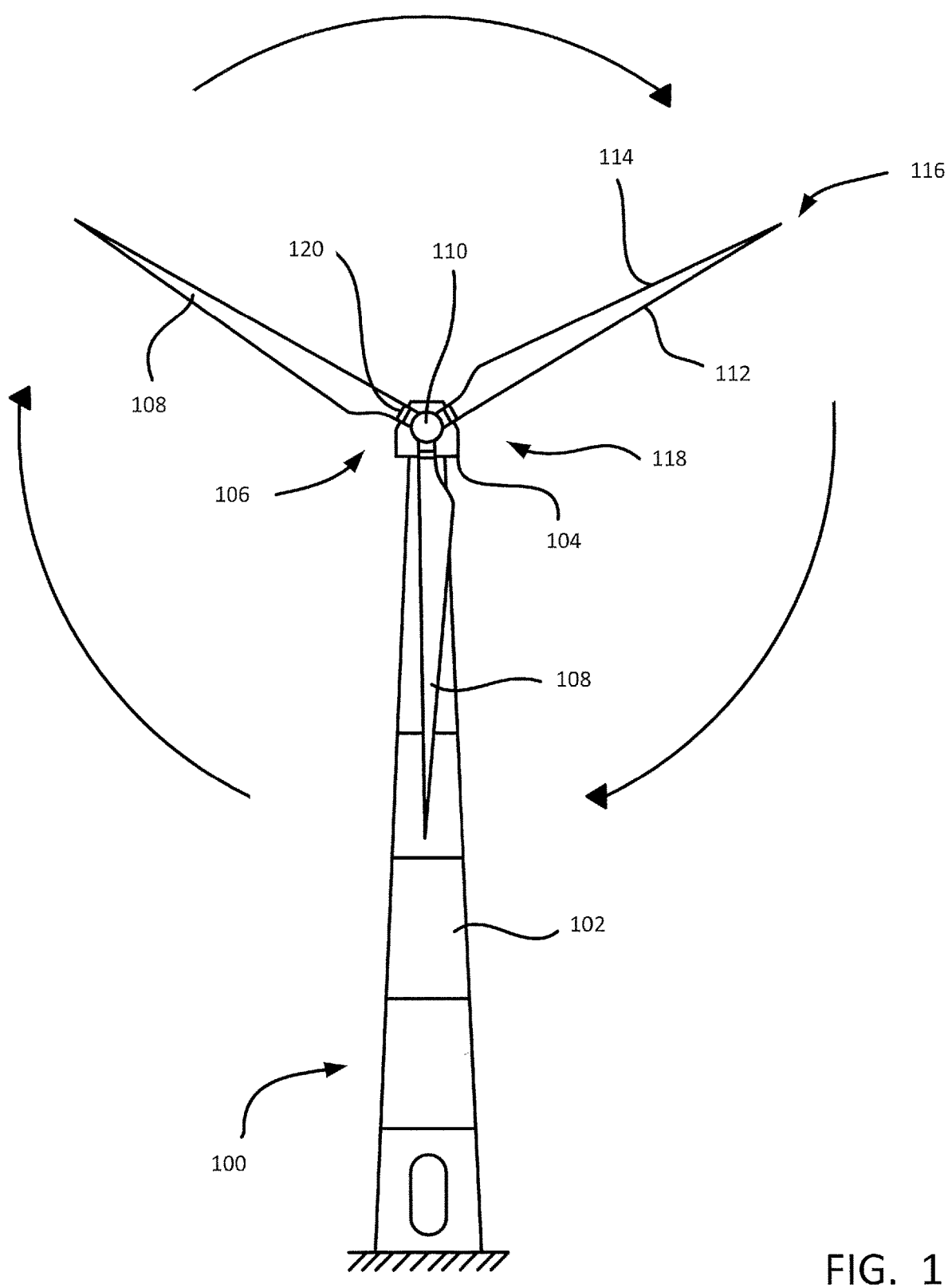
FIG. 1 illustrates a diagrammatic view of a wind turbine, according to an embodiment described in this present disclosure.

FIG. 1 illustrates a diagrammatic view of an exemplary Wind Turbine Generator (WTG) 100. Although the WTG 100 is illustrated as a horizontal-axis wind turbine, the principles and techniques described herein may be applied to other wind turbine implementations, such as vertical-axis wind turbines. The WTG 100 typically comprises a tower 102 and a nacelle 104 located at the top of the tower 102. A rotor 106 may be connected with the nacelle 104 through a low-speed shaft extending out of the nacelle 104. As shown, the rotor 106 comprises three rotor blades 108 mounted on a common hub 110, which rotate in a rotor plane, but the rotor 106 may comprise any suitable number of blades 108, such as one, two, four, five, or more blades 108. The blades 108 (or airfoil(s)) typically each have an aerodynamic shape with a leading edge 112 for facing into the wind, a trailing edge 114 at the opposite end of a chord for the blades 108, a tip 116, and a root 118 for attaching to the hub 110 in any suitable manner.

For some embodiments, the blades 108 may be connected to the hub 110 using pitch bearings 120, such that each blade 108 may be rotated around a respective longitudinal axis to adjust the blade's pitch. The pitch angle of a blade 108 relative to the rotor plane may be controlled by linear actuators, hydraulic actuators, or stepper motors, for example, connected between the hub 110 and the blades 108.

Figure 2:
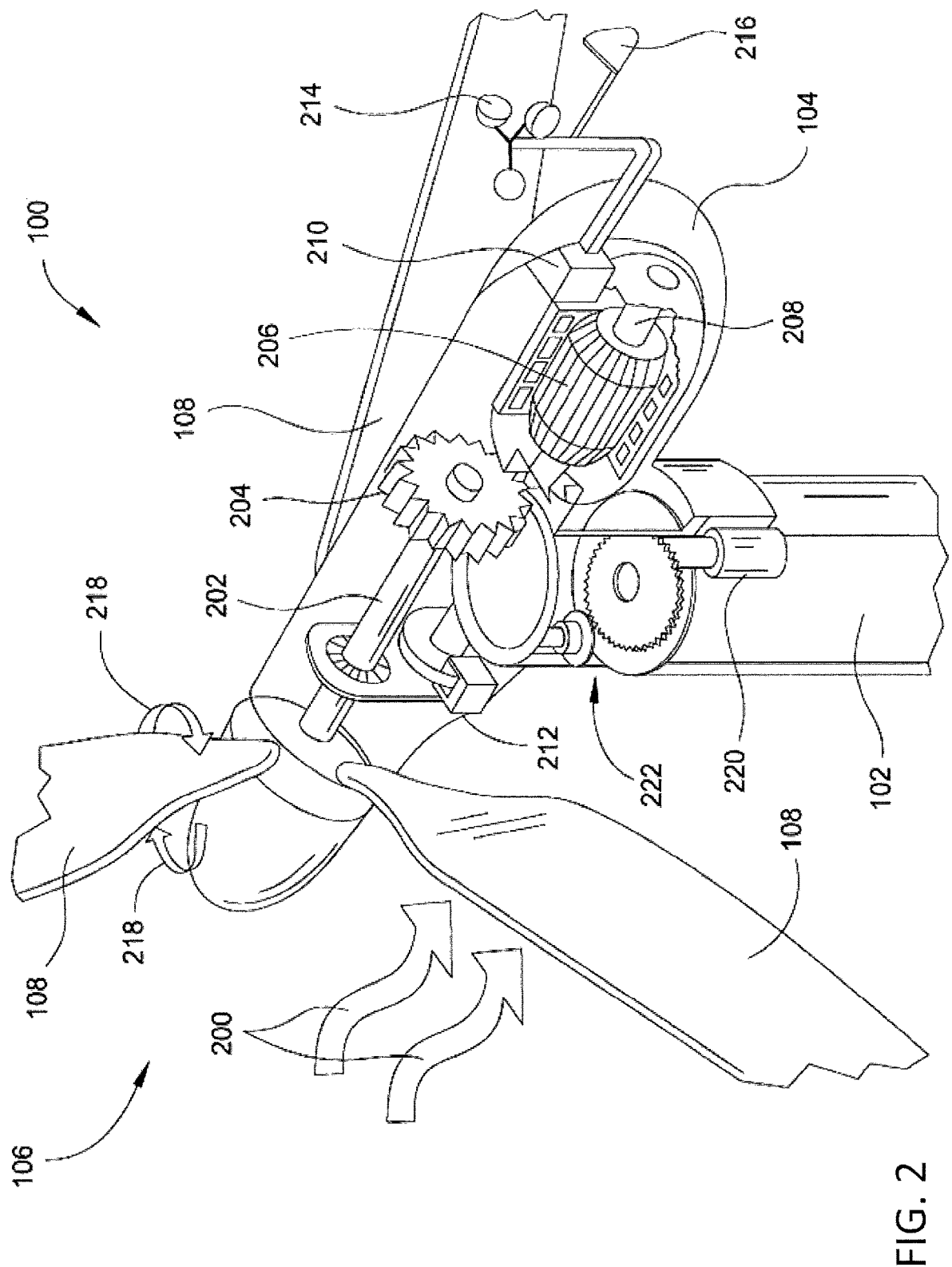
FIG. 2 illustrates a diagrammatic view of the components internal to the nacelle and tower of a wind turbine, according to an embodiment described in this present disclosure.

FIG. 2 illustrates a diagrammatic view of typical components internal to the nacelle 104 and tower 102 of the WTG 100. When the wind 200 is incident on the blades 108, the rotor 106 rotates and rotates a low-speed shaft 202. Gears in a gearbox 204 mechanically convert the low rotational speed of the low-speed shaft 202 into a relatively high rotational speed of a high-speed shaft 208 suitable for generating electricity using a generator 206.

A controller 210 may sense the rotational speed of one or both of the low-speed shaft 202 and the high-speed shaft 208. If the controller 210 determines that the shaft(s) are rotating too fast, the controller 210 may pitch the blades 108 out of the wind 200 or by increasing the torque from the generator 206 which slows the rotation of the rotor 106—i.e., reduces the revolutions per minute (RPM). A braking system 212 may prevent damage to the components of the WTG 100 by keeping the hub 110 from rotating when the hub 110 is already at, or very close, to standstill. The controller 210 may also receive inputs from an anemometer 214 (providing wind speed) and/or a wind vane 216 (providing wind direction). Based on information received, the controller 210 may send a control signal to one or more of the blades 108 to adjust the pitch 218 of the blades 108. By adjusting the pitch 218 of the blades 108, the rotational speed of the rotor 106 (and therefore, the shafts 202, 208) may be increased or decreased. Based on the wind direction, for example, the controller 210 may send a control signal to an assembly comprising a yaw motor 220 and a yaw drive 222 to rotate the nacelle 104 with respect to the tower 102, such that the rotor 106 may be positioned to face more (or, in certain circumstances, less) upwind.

Figure 3:
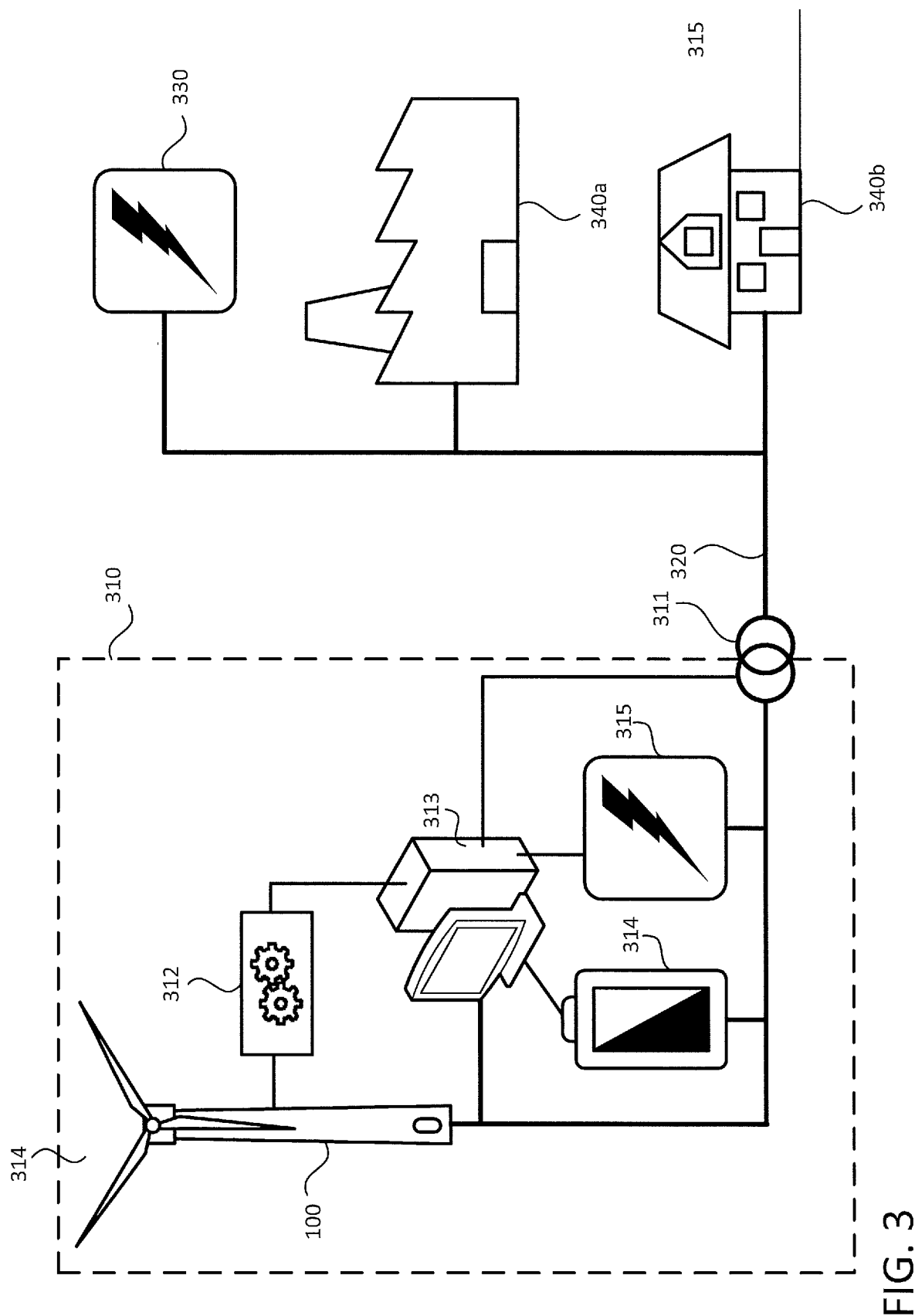
FIG. 3 illustrates a hybrid wind power plant connected to a power grid to which an external generator and various other loads are also connected, according to an embodiment described in this present disclosure.

FIG. 3 illustrates a hybrid power plant (HPP) 310 connected to a power grid 320 to which an external generator 330 and various loads 340a-b (generally, load 340) are also connected. The grid 320 includes various substations and transmission lines that electrically link the HPP 310, the external generator 330, and the various loads 340.

The HPP 310 includes one or more WTGs 100 that produce electrical power for consumption internally within the HPP 310 and externally by one or more loads 340 connected to the grid 320. The HPP 310 is connected to the grid 320 via a point of common coupling (PCC) 311, so that power produced by the one or more WTGs 100 can be transmitted to the grid 320, and so that power drawn from the grid 320 can be supplied to the ancillary systems 312 of the WTGs 100 and the support systems 313 of the hybrid power plant 310. In various embodiments, the PCC 311 includes a circuit breaker that can open and close to selectively break or make an electrical connection with the grid 320. Although illustrated as a transformer, one of ordinary skill in the art will appreciated that the precise location of the PCC 311 may be on the grid side or the line side of the transformer. The PCC 311 can include a power meter or grid meter to measure power drawn from the grid 320, although such meters may also be located at other locations in the HPP 310.

The ancillary systems 312 are associated with individual WTGS 100 and include powered systems that include, but are not limited to: a controller 210; an anemometer 214, a wind vane 216, or other sensor; a yaw motor 220, a yaw drive 222, blade pitch motor, or other motor/drive; safety lighting; deicing systems, cooling systems; and the like that need to be powered (or have power available) for operation even when the WTG 100 is not producing power. The support systems 313 are associated with the HPP 310 as a whole, or individual components other than WTGs 100 in the HPP 310, and include powered systems that include, but are not limited to: a power plant controller computing device; various sensors; powered actuators (e.g., for circuit breaker control); lighting; and the like that need to be powered (or have power available) for operation even when the WTGs 100 are not producing power. The ancillary systems 312 and support systems 313 are collectively referred to herein as the "powered systems," and any reference to the powered systems includes uses cases in which only some or all of the ancillary systems 312 are implicated, only some or all of the support systems 313 are implicated, and where some or all of the ancillary systems and support systems are implicated. Stated differently, it will be appreciated that some of the powered systems may be offline in various use cases and examples.

The HPP 310 includes one or more alternative power sources that include one or more energy storage systems (ESS) 314 and/or one or more auxiliary generators 315, which may be used to supplement power generated by the WTGs 100 and output to the grid 320 or to supply power to the powered systems in addition to or instead of the grid 320 when the WTGs 100 are not producing sufficient power. The ESS 314 may include various chemical batteries, capacitors, or mechanical batteries (e.g., flywheels) that selectively store and release power. The auxiliary generators 315 include various fueled generators (e.g., diesel, propane, natural gas, hydrogen, biomass) and renewable generators (e.g., photovoltaic generators, hydroelectric generators). The ESS 314 and auxiliary generators 315 may be used when the HPP 310 is connected to the grid 320 to supplement or smooth power output to the grid 320 or to supplement, smooth, or replace power drawn from the grid 320 to replace or supplement power from the WTGS 100. The ESS 314 and auxiliary generators 315 may also be used when the HPP 310 is not connected to the grid 320 or is otherwise islanded to assist in cold-starts of the HPP 310, to smooth connecting to the grid 320, or to provide power to the powered systems when no other power source is available.

The external generator 330 represents one or more power generating stations or plants connected to the power grid 320, which may include other wind farms, hybrid plants, hydroelectric dams, fueled steam plants (e.g., coal, natural gas, nuclear, or biomass), and the like. When the hybrid power plant 310 draws power from the grid 320, the external generators 330 supply that power to the hybrid power plant 310.

The loads 340 represent various consumers of power that are connected to the grid 320 including industrial, residential, commercial, and governmental consumers. Various loads 340 on different parts of the grid 320 may have different demand curves that the grid 320 manages in different ways. For example, a grid operator may signal various power generators to come online or go offline as demand increases and decreases throughout the day. In another example, a grid operator may charge different rates depending on a time of day at which power is consumed or a peak draw on the power within a time period to encourage consumers to load spread.

Depending on conditions in the grid 320 (including line capacity; the number, location, and excess capacity of external generators 330; power conditioning and draw of existing loads 340; etc.), adding a new load 340 to the grid 320 or increasing the draw of an existing load 340 on the grid 320 may disrupt operations of other loads 340. For example, when a HPP 310 begins to draw power from the grid 320 as a new load rather than a generator for the grid 320, the increased power requirements on the grid 320 may cause some other loads 340 to experience "brown outs," load shedding, the activation of power conditioning equipment (e.g., uninterruptible power supply (UPS) units), among other deleterious effects. These effects may be more pronounced when the peak power requirement of the HPP 310 is correspondingly higher; causing greater strain on the grid 320 when the amount of power is demanded in a shorter time frame than if the same amount of power were demanded over a longer time frame. Additionally, a grid controller (e.g., a power plant controller in the PCC 311) may restrict how much power the HPP 310 is able to consume in a given time frame.

Accordingly, a power plant controller unit (e.g., a computing device included in the support systems 313) balances the output from the ESS 314, the auxiliary generator 315, and power drawn from the grid 320 based on the charge level and output capacity of the ESS 314, the production capacity (including expected duration of rated output) and startup delay of an auxiliary generator, a peak draw threshold set for acquiring power from the grid 320, and a predicted length of time that external/auxiliary power will be required for. Startup delay of an auxiliary generator indicates the time it takes to start up the generator, e.g. the time between the command to generate power is received and power is generated. The capacity of the alternative power sources includes measures of the peak or rated output of the power source as well as measures of duration (e.g., SoC for batteries, fuel level vs consumption rate for fueled generators, hours of daylight remaining for solar cells), and can also include modifications to those values that account for environmental conditions (e.g., cloud cover reducing effectiveness of solar cells to X % of the rated output), production margins (e.g., reserving X % of SoC or fuel capacity for special use cases), and scheduled operational conditions (e.g., taking X % of a battery array offline for maintenance, fuel deliveries are scheduled every D days).

Figure 4:
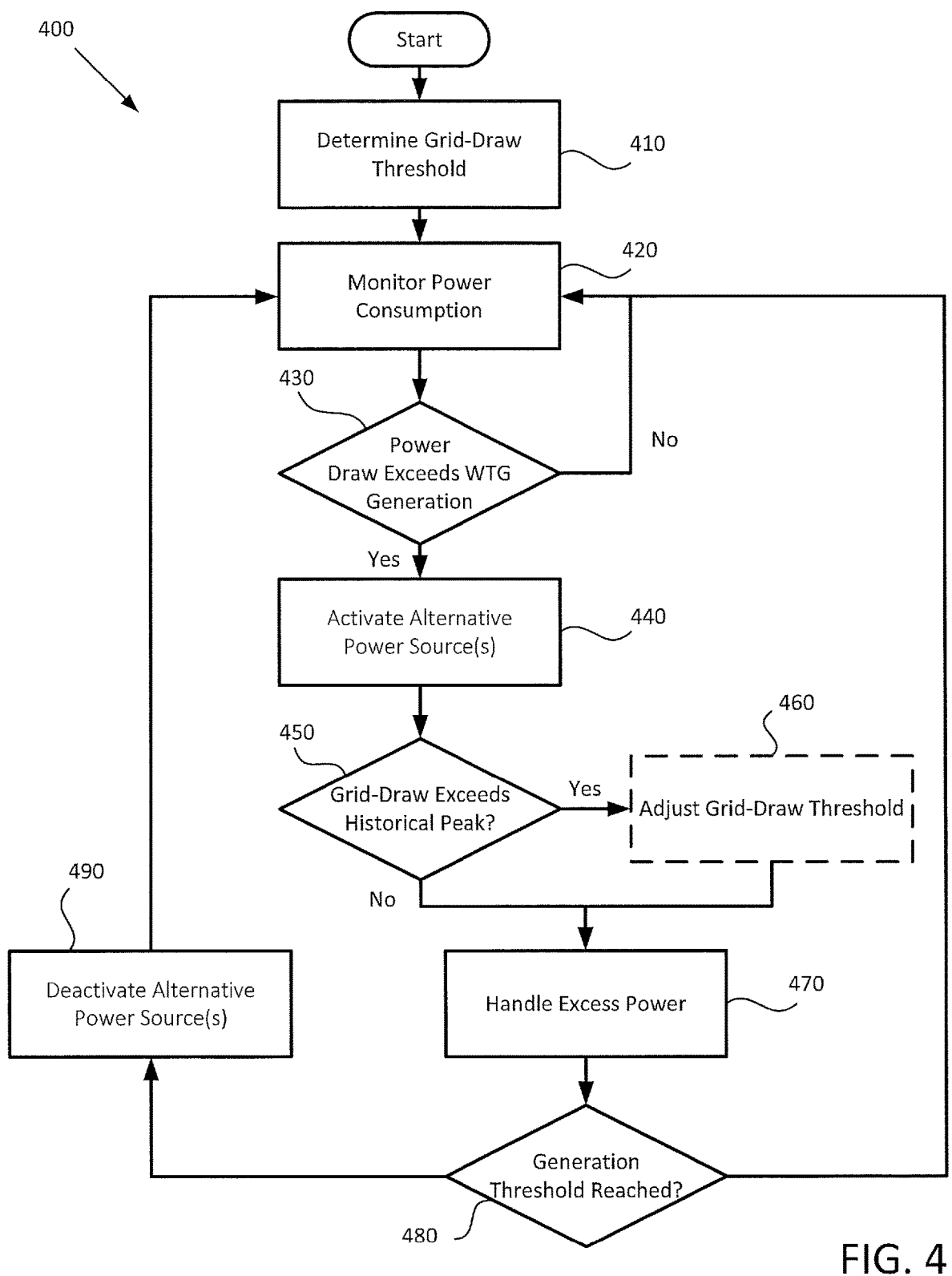
FIG. 4 is a flowchart of a method 400 for powering systems in a hybrid wind power plant using power sources instead of or in addition to the wind turbine generators, according to embodiments of the present disclosure

FIG. 4 is a flowchart of a method 400 for powering systems in a HPP 310 using power sources instead of, or in addition, to the WTGs 100, according to embodiments of the present disclosure. The determination of which alternative power source to use, how much power to draw from the alternative power source, and for how long may be based on various conditions, is described in greater detail in regard to FIG. 5.

Method 400 begins with block 410, where the operator of the HPP 310 determines a grid-draw threshold from the grid 320 for the HPP 310. The grid-draw threshold defines an amount of power that the HPP 310 is desirable or allowable to draw from the grid 320 in a given situation due to grid requirements, operator preference, and the capacity of the HPP 310. For example, the grid 320 may specify that draw is limited to x kW (kilowatts) per unit of time, so that draw from the HPP 310 does not destabilize power delivery to other loads 340 connected to the grid 320. In another example, an operator may prefer to draw power stored in an ESS 314 or available from an auxiliary generator 315 before drawing power from the grid 320 or to limit draw from the grid below y kW per unit of time. In a further example, a circuit breaker or fuse in the HPP 310 may trip or open a circuit if more than z kW per unit of time are drawn from the grid 320.

In various embodiments, the grid-draw threshold may change based on the time of day, time of year, previous peak draws, etc. For example, a grid operator may allow the operator of the HPP 310 to draw more power during a time of day associated with lower demand from the other loads 340. In another example, when fuel reserves for a fueled auxiliary generator 315 fall below a given setpoint, during the night or a cloudy day for a solar auxiliary generator 315, during a maintenance period for the ESS 314 or auxiliary generators 315, etc., the operator of the HPP 310 may raise the grid-draw threshold to change how much power can be drawn from the grid in a given situation.

At block 420, the operator monitors the power consumption (e.g. the draw requirement) for the powered systems in the HPP 310. For example, the plant operator may use one or more power meters or grid meters disposed in the HPP 310 to monitor power draw from the grid 320. The power draw requirement indicates an amount of powered required for the powered systems in the HPP 310, which may vary as different systems activate and deactivate according to the operational requirements of the HPP 310. Some powered systems may exhibit a constant power draw, such as, for example, airplane warning lights, sensors, power plant controller computing devices, etc. Other powered systems may exhibit intermittent or variable power draws, such as, for example, a deicing system that is activated or deactivated based on ambient temperature and weather conditions, various motors used to adjust the facing of the blades 108 or nacelles 104 of a WTG 100 relative to the direction of the wind, etc.

In various embodiments, the operator can predict how much power/energy is predicted to be needed in the near future as part of or in response to monitoring the power draw. The power plant operator can use a statistical and machine learning model to monitor the current power draw requirement to target how much power and energy the HPP 310 will need to be provided in certain hours and under certain conditions. For example, a machine learning model can be trained via historical draw and demand data, the current monitoring data, and meteorological models and other forecasting data.

At block 430, the power plant operator determines whether the power draw of the powered systems exceeds the power generated by the WTGs 100. When the power generated by the WTGs 100 is sufficient for powering the powered systems, method 400 returns to block 420 for the power plant operator to continue monitoring the power draw requirements of the powered systems. When the powered generated by the WTGs 100 is insufficient for powering the powered systems, method 400 proceeds to block 440. In some embodiments, as part of block 430, the power plant operator may selectively deactivate various powered systems to reduce the power draw requirement for the NPP 310 (e.g., taking non-essential systems offline until the WTGs 100 return to a power generating state) to prioritize returning to block 420 over proceeding to block 440.

At block 440, the power plant operator activates one or more alternative power sources, such as discharging an ESS 314 or activating an auxiliary generator 315. Any difference between the power provided by the ESS 314 and/or auxiliary generator 315 and the demand from the powered systems is provided by the grid 320. When the power provided by the grid 320 and the alternative power sources is insufficient to meet the power demands from the powered systems, the power plant operator may prioritize various systems to receive power over other systems. As used herein, the terms "active," "activated," "activating," "activation" and variants thereof refer to a power source that is controlled to provide power. For example, when activating a power source, that power source is controlled to be in an active state so that power generated or stored at that power source is provided to one or more systems while the power source remains activated. Similarly, the terms "inactive", "inactivated" "inactivate," "inactivation," "inactivating," "deactivate," "deactivated," "deactivates" "deactivation" and variants thereof refer to a power source that is controlled to not provide power or to stop providing power to one or more systems. For example, an active power source may be deactivated to control that power source to stop providing power to the linked systems, and the power source will remain deactivated or inactive until a power plant operator next controls the power source to provide power (e.g., re-activates the power source).

At block 450, the power plant operator observes whether the power drawn from the grid 320 exceeds a historical peak grid-draw for a given length of time. When the power drawn from the grid 320 in a given length of time is higher than any historical grid-draw in a similar length of time, method 400 proceeds to block 460. When the power drawn from the grid 320 within a given length of time is less than or equal to a previously observed amount of power drawn from the grid 320 within similar length of time, method 400 proceeds to block 470.

At block 460, the power plant operator optionally adjusts the grid-draw threshold (from the value as initially determined in block 410) to account for the power drawn from the grid 320 exceeding previously observed values for a given time period. In various embodiments, the historic peak grid-draw may be reset every day, month, quarter, year, etc. corresponding to a measurement cycle for an operator to determine and use the historic peak grid-draw for a given time period when adjusting the grid-draw threshold. For example, a grid operator may assess different rates for power consumed by the HPP 310 based on the highest-observed peak grid-draw rate within a billing cycle, and once a threshold is passed, reaching that threshold again during a given cycle has no effect on the total assessment for power consumed while exceeding a subsequent threshold will have an effect on the total assessment, and therefore is to be avoided. In another example, a HPP 310 may be unaware how sensitive the other loads 340 on the grid 320 are to spikes in power draw, and as the HPP 310 draws power from the grid 320 with various peak values, the operator learns whether the other loads 340 were adversely affected, and can adjust the grid-draw threshold accordingly. At the end of a measurement cycle (or at the beginning of a subsequent measurement cycle), the operator resets the grid draw threshold to an initial value, which may be zero or another predefined initial value to attempt to keep grid draw below (until consumption reaches that initial value). For example, an operator may endeavor to keep grid draw below X kW in any given month. If grid draw exceeds X kW in a first month (i.e., X+Y kW), the operator endeavors to keep grid draw below X+Y kW for the rest of the first month, but at the beginning of a second month will again endeavor to keep grid draw below X kW.

At block 470, the power plant operator handles any excess power produced by the alternative power sources beyond that power used by the internal systems of the HPP 310. In some embodiments, the power plant operator injects excess power into the power grid 320. In some embodiments, the power plant operator uses excess power generated by auxiliary generators 315 to charge the ESS 314.

At block 480, the power plant operator determines whether a generation threshold is reached for the HPP 310. The power plant operator sets the generation threshold to indicate when to deactivate one or more alternative power sources in the HPP 310. For example, a power plant operator may set the generation threshold to be satisfied when the WTGs 100 generate sufficient power to meet or exceed the demands of the powered systems for at least n seconds. In another example, the generation threshold for may be satisfied when a state of charge (SoC) or fuel level reaches a predefined level for a given ESS 314 or auxiliary generator 315 (e.g., to maintain black start capabilities). When a generation threshold is reached, method 400 proceeds to block 490. Otherwise, method 400 returns to block 420 to continue monitoring power draw requirements to meet the needs of the powered systems.

At block 490, in response to satisfying the generation threshold, the power plant operator deactivates one or more alternative power sources. In various embodiments, once deactivated, a power source may be reactivated (per block 440) due to changing conditions in the HPP 310. For example, an ESS 314 that is deactivated when an auxiliary generator 315 comes online may be reactivated if the power demand exceeds the output capacity of the auxiliary generator 315. In another example, an ESS 314 that is deactivated when a SoC level reaches a given value (e.g., 20% charge) may be reactivated after being recharged above the given value. Method 400 returns to block 420 to continue monitoring power draw requirements to meet the needs of the powered systems after block 490.

Figure 5:
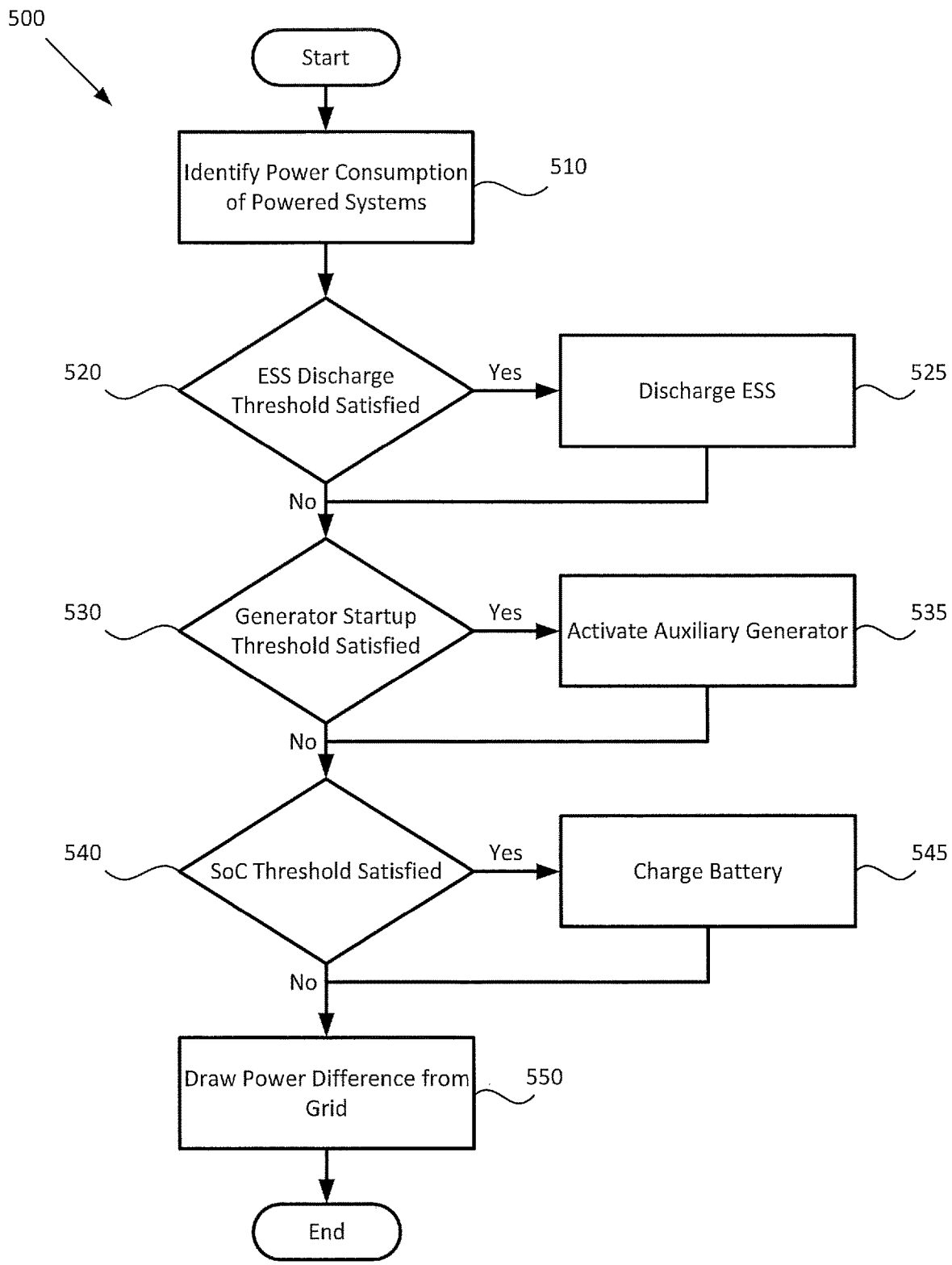
FIG. 5 is a flowchart of a method for prioritizing power draw from various sources by a hybrid wind power plant, according to embodiments of the present disclosure

FIG. 5 is a flowchart of a method 500 for prioritizing power draw from various sources by a HPP 310, according to embodiments of the present disclosure. Method 500 may be understood in conjunction with the scenarios 600*a*-*d* illustrated in FIGS. 6A-6D. FIGS. 6A-6D illustrate several scenarios 600*a*-*d* for satisfying a power demand curve 610 in a HPP 310, according to embodiments of the present disclosure. In each of the scenarios 600*a*-*d*, the power demand curve 610 represents a difference between the power output by the WTGs 100 in a HPP 310 and the demands of the powered systems therein. In various embodiments, the power demand curve 610 may represent a case in which the WTGs 100 are producing a steady power less than is required by the powered systems (including when the WTGS 100 produce no power), and the powered systems are drawing a variable amount of power. In other embodiment, the power demand curve 610 represents a case in which the powered systems are drawing a steady amount of power, but the WTGs 100 are producing a variable amount of power. In yet other embodiments, the power demand curve 610 represents a case in which power produced by the WTGs 100 varies and the demand from the powered systems also varies over time.

As illustrated in FIGS. 6A-6D, positive values of the power demand curve 610 represent a greater demand for power from the powered systems than the WTGs 100 are capable of providing at a given time, and which an operator supplies from one or more of the grid 320, an ESS 314, and an auxiliary generator 315. In contrast, negative values of the power demand curve 610 represent periods of time where the WTGs 100 produce sufficient power to exceed the power requirements of the powered systems, and any excess power may be supplied to the grid 320 or stored in an ESS 314 in various embodiments.

Method 500 begins with block 510, where a power plant operator identifies the power consumption for the powered systems in a HPP 310 that exceed the present power generating capacity of the WTGs 100 in the HPP 310. For example, to operate the powered systems throughout a HPP 310 when the power produced by the WTGs 100 is insufficient to meet those needs (e.g., during a lull in the wind, during a maintenance inspection, or another event when rotation of the WTGs 100 does not produce sufficient power), the HPP 310 may draw power from one or more of the grid 320, an ESS 314, or an auxiliary generator 315. The power demand may vary over time as various powered systems come online, request different amounts of power, or go offline, and as the WTGs 100 produce different amounts of power.

Figure 6A:
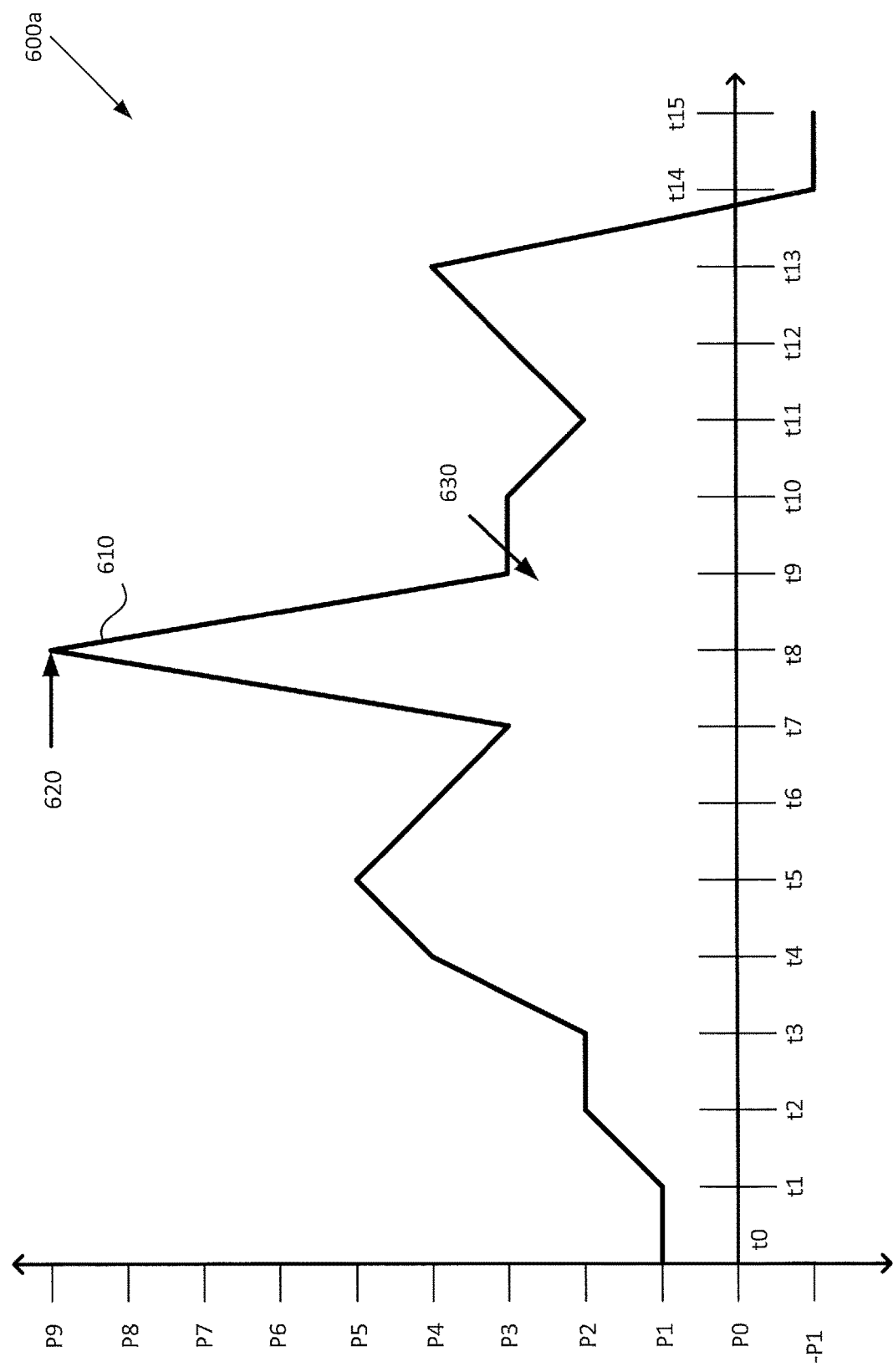
FIGS. 6A-6D illustrate several scenarios for satisfying a power demand curve in a HPP, according to embodiments of the present disclosure.

FIG. 6A illustrates a power demand curve 610 over a period of time from $t_0$ to $t_{15}$ with a demand ranging from $-P_1$ (corresponding to a power surplus of $P_1$) to $P_9$. The power demand curve 610 exhibits a peak consumption value 620 corresponding to the highest power indicated on the power demand curve 610 (i.e., $P_9$ in the present examples), and a total power demand 630 corresponding to the area under the power demand curve 610. To meet the needs of the powered systems, as indicated by the power demand curve 610, the power plant controller may discharge an ESS 314, use power provided from an auxiliary generator 315, or draw power from the grid 320. The peak consumption value 620 (also referred to as the plant ancillary peak demand) refers to the highest level of powered demand of the ancillary systems of the HPP 310, which may be based on knowledge on how much power the HPP 310 can consumer, which may be based on the consumption rate of one WTG 100 and the number of WTGs 100 in the HPP 310.

In some embodiments, the peak consumption value 620 can refer to the demand for power from a single WTG 100 in the HPP 310 (referred to as an individual ancillary peak demand in such cases). In a heterogeneous deployment that includes WTGs 100 of different constructions and power requirements, the plant ancillary peak demand may be determined as the sum of the individual ancillary peak demands, while a homogenous deployment that includes WTGs 100 of a single construction and power requirement may be determined by the number of WTGs 100 multiplied by the individual peak demand.

In various embodiments, the power demand curve 610 is a predictive measure used by a power plant controller with one or more predictive algorithms so that before a powered system requires a given amount of power, the powered system indicates a predicted power demand to the power plant controller. For example, when a sensor identifies that a WTG 100 will activate a motor to adjust the facing of the blades 108 relative to the wind, the power plant controller may predict how much power is required to move those blades 108 into the wind at least n seconds before power is supplied to the motor(s). In another example, when a power plant controller identifies that the wind will be insufficient to drive the WTGs 100 to satisfy the power demand curve 610, the power plant controller may preemptively begin activating an auxiliary generator 315, allow an auxiliary generator 315 to remain active, charge an ESS 314 from the grid 320, or the like. The peak consumption value 620 can correspond to one plant-wide event requiring a large consumption of power or several individual events in the WTGs 100 occurring at the same time, which the power plant controller can predict before the event occurs or react to once the event occurs (or the power consumption therefor is measured). In one example, when a wind condition is predicted or measured upwind of the WTGs 110, the power plant controller can predict what amount of power will be required to yaw all or several WTGs 100 at the same into or out of the wind. In another example, when a temperature condition is forecasted or measured, the power plant controller can predict what amount of power will be required for running the de-icing or warming systems on all or several of the WTGs 100 in the HPP 310.

Figure 6B:
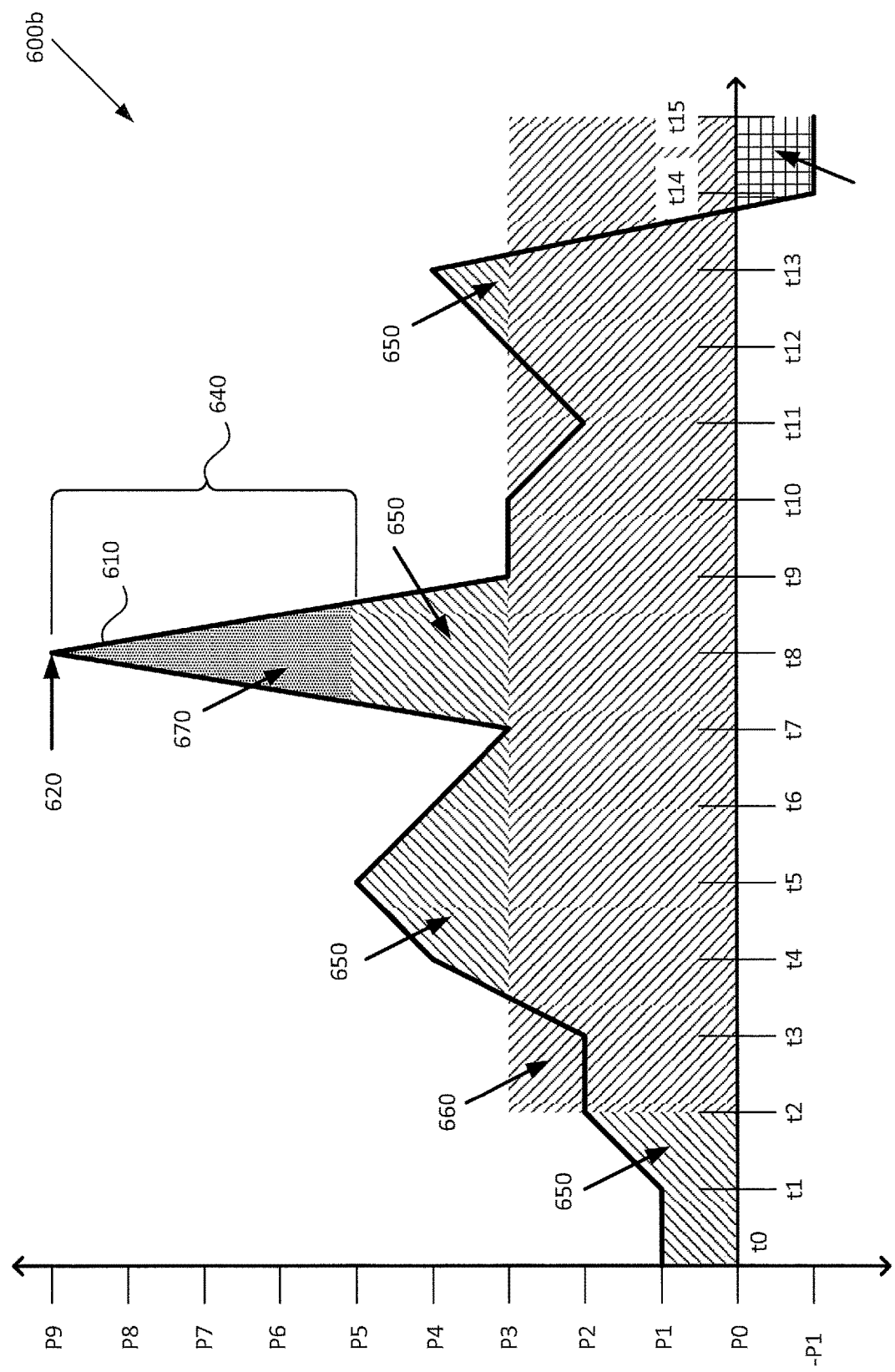
Figure 6C:
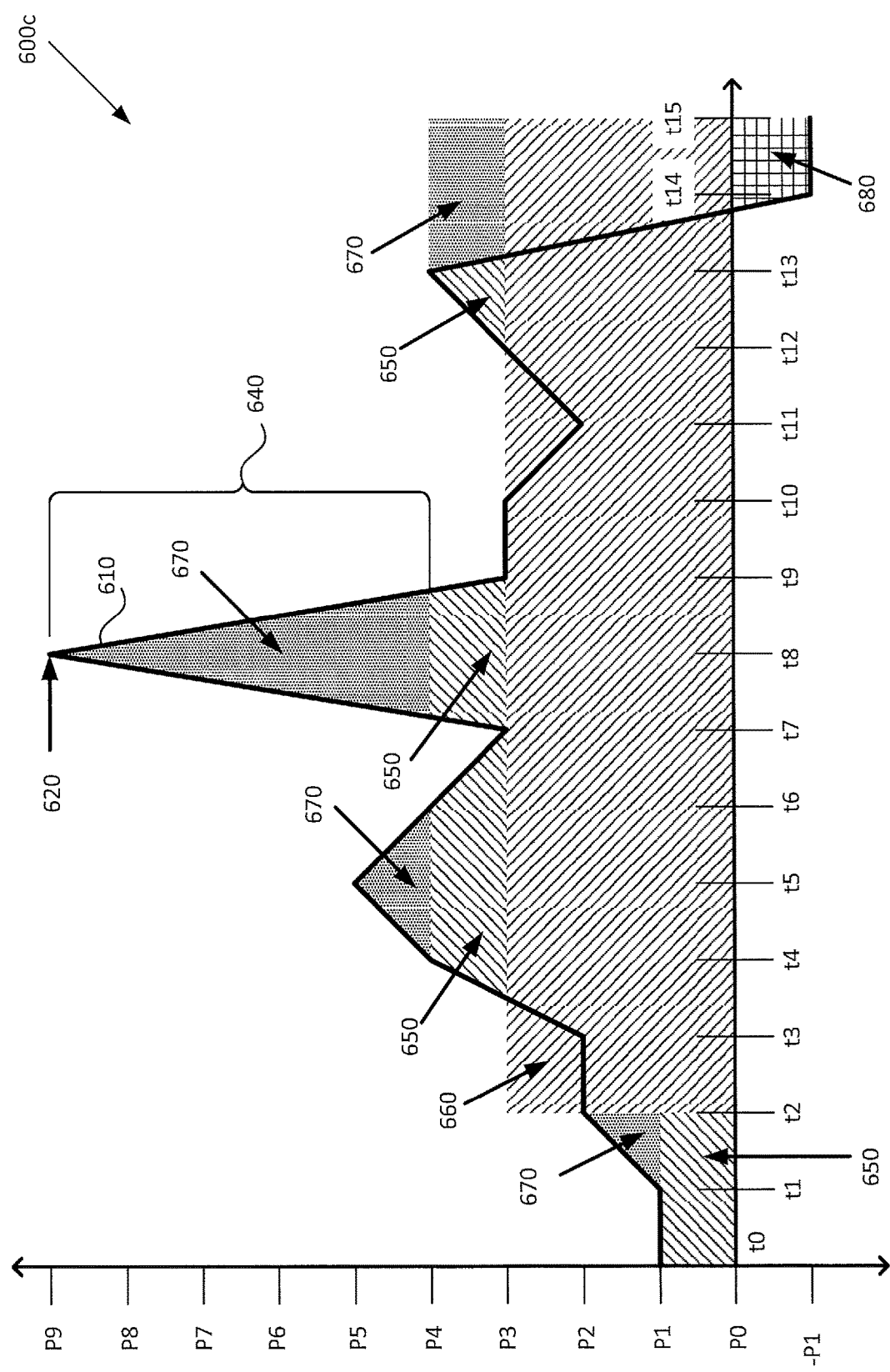
Figure 6D:
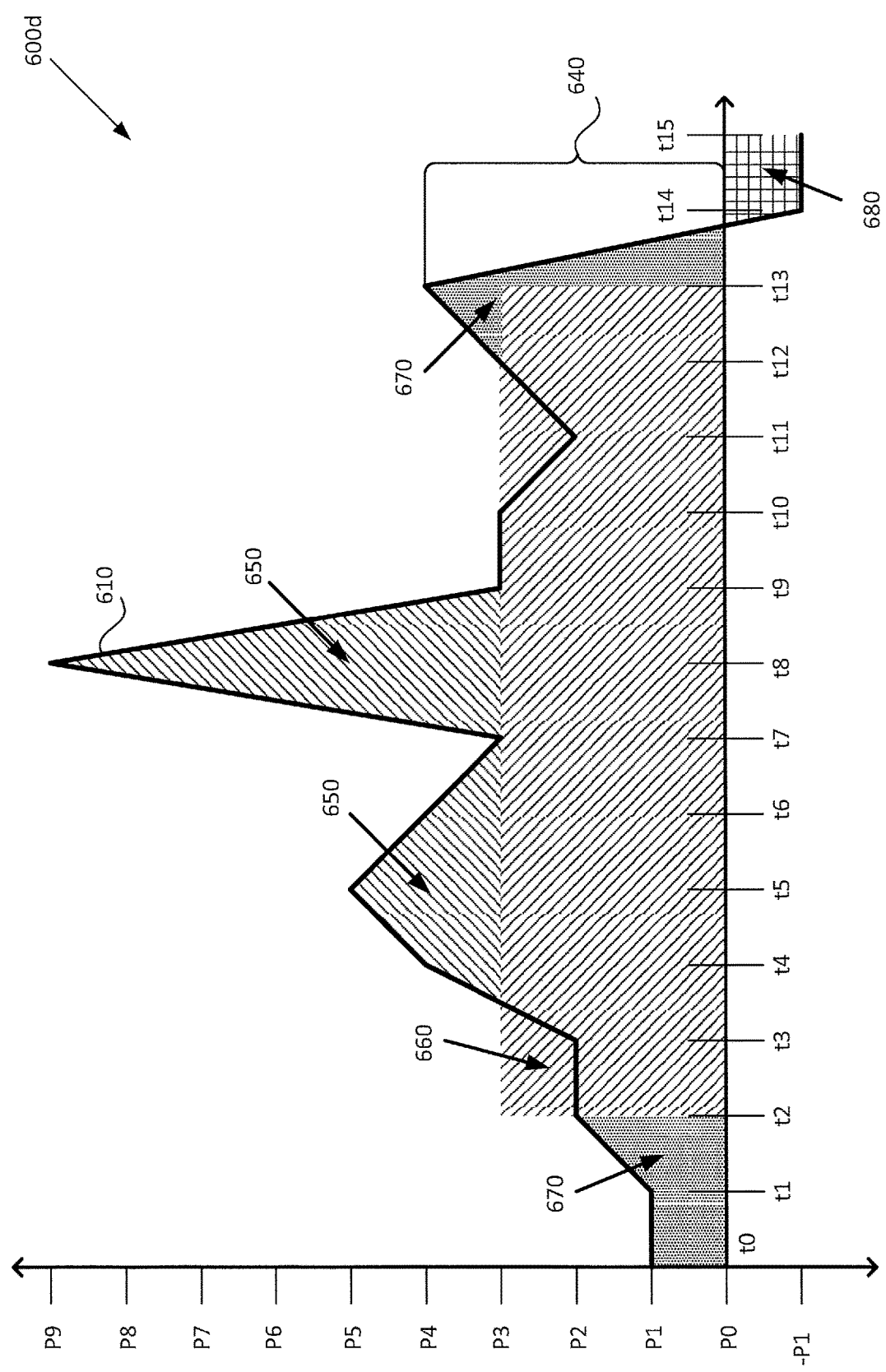

FIGS. 6B-6D illustrate different scenarios 600b-d by which an operator may fulfil the power requirements indicated by the power demand curve 610, prioritizing the use of power available from ESS 314, auxiliary generators 315, and the grid 320 in various scenarios based on different discharge thresholds and capabilities of the various power sources. In each of the illustrated scenarios 600b-d, the sources used to meet the total power demand 630 are indicated, as is the peak grid-draw 640, which indicates the highest amount of power required to be drawn from the grid 320 in a given scenario 600b-d. For example, ESS power 650 indicates portions of the total power demand 630 that are met by drawing power from the ESS 314, generator power 660 indicates portions of the total power demand 630 that are met by drawing power from the auxiliary generator 315, grid power 670 indicates portions of the total power demand 630 that are met by drawing power from the grid 320, and wind power 680 indicates portions of the total power demand 630 that are generated by the WTGs 100. Individually or collectively, the ESS power 650 and the generator power 660, when used to reduce or delay drawing power from the external grid 320 may be referred to as offset power.

FIG. 6B generally illustrates a scenario 600b where the power plant operator uses power from an ESS 314 during activation of the auxiliary generator 315 and to supplement the output of the auxiliary generator 315 before drawing power from the grid 320. From times $t_0$ to $t_2$, while the auxiliary generator 315 is coming online, ESS power 650 is drawn to meet the demands of the powered systems. From times $t_2$ to $t_{15}$, the auxiliary generator 315 provides a specified peak value of generator power 660. The peak value of the generator power 660 may exceed the power demand curve 610 (e.g., as from times $t_2$ to $t_3$ or $t_{10}$ to $t_{12}$), and the excess power may be provided to charge the ESS 314 or be output to the grid 320. When the peak power demanded from the powered systems exceeds the capacity of the auxiliary generator 315 (e.g., as from times $t_4$ to $t_6$ or $t_{12}$ to $t_{13}$), the ESS 314 is discharged along with the auxiliary generator 315 to meet the power demands of the powered systems. However, if the combined power output capabilities of the ESS 314 and the auxiliary generator 315 is less than the peak demand, the operator can draw grid power 670 to meet the difference in demand. In contrast, when the output power from one or more of the ESS 314, the auxiliary generator 315, and the WTGS 100 is greater than the peak demand (e.g., as from times $t_2$ to $t_3$, $t_{10}$ to $t_{12}$, and $t_{14}$ to $t_{15}$), the excess power may be transmitted to the grid 320 or supplied to charge the ESS 314. As indicated in FIG. 6B, the ESS 314 provides up to $P_2$ worth of peak power, the auxiliary generator 315 provides up to $P_3$ worth of peak power, and the grid 320 supplies any difference between the combined internally provided power and the power demand curve 610. Thus, a peak consumption value 620 of $P_9$ may result in a peak grid-draw 640 of only $P_4$ (i.e., $P_9-P_3-P_2$), which results in less strain on the grid 320 and fewer adverse effects on the other loads 340 connected thereto.

FIG. 6C generally illustrates a scenario 600c where the power plant operator has provided an ESS 314 with a lower peak output of $P_1$ compared to the peak output of $P_2$ of the ESS 314 in the scenario 600b in FIG. 6B, Accordingly, from times $t_0$ to $t_2$ and $t_4$ to $t_6$ in FIG. 6C, the operator provides grid power 670 to supplement the ESS power 650 and generator power 660, whereas the power demand 630 from the equivalent times in FIG. 6B is satisfied by the ESS power 650 and generator power 660 without grid power 670. Accordingly, the peak grid-draw 640 is higher in scenario 600c than scenario 600b (i.e., $P_5$ rather than $P_4$) due to the lower output from the ESS 314 in scenario 600c. In various embodiments, an operator may prefer to draw more power from the grid 320 (per scenario 600c) to size and deploy a smaller ESS 314, to discharge the ESS 314 more slowly (e.g., to ensure against power draw for longer), when the grid 320 is more resilient to adding new loads, or when the overhead associated with drawing grid power 670 is lower. Additionally, as shown from times $t_{13}$ to $t_{15}$ in FIG. 6C, the operator may draw power over the power demand curve from grid power 670, generator power 660, and/or wind power 680 to recharge the ESS 314.

FIG. 6D generally illustrates a scenario 600d where the power plant operator holds the ESS 314 in reserve to supplement the power output from an auxiliary generator 315. From time $t_0$ to time $t_2$, while the auxiliary generator 315 comes online, the power demand is met by grid power 670. While the auxiliary generator 315 is active (e.g., from times $t_2$ to $t_{13}$), a generator power 660 of $P_3$ is provided, which may be equal to, less than, or greater than the power demanded by the powered systems at a given time. When the generator power 660 exceeds the power demand curve 610, the excess power may be provided to the grid 320 or stored in an ESS 314. When the generator power 660 is less than the power demand curve 610, an ESS 314 may discharge (e.g., as from times $t_4$ to $t_7$ or $t_7$ to $t_9$) or additional power may be drawn from the grid (e.g., as from times $t_{12}$ to $t_{13}$). As illustrated, grid power 670 is drawn from times $t_{12}$ to $t_{14}$ with a peak grid-draw 640 of $P_4$. In various embodiments, the ESS 314 may not discharge from times $t_{12}$ to $t_{14}$ due to a SoC level of the ESS 314 (e.g., having fully discharged or discharged to a reserve power level from times $t_3$ to $t_9$), and the auxiliary generator 315 may cease outputting power from times $t_{13}$ to $t_{14}$ in anticipation of the wind power 680 coming back online to conserve fuel or due to a fuel level (e.g., running out of fuel, conserving fuel to a reserve level).

Accordingly, the determination of whether and when to activate a given power source or to recharge an ESS 314 may be based on various thresholds and input criteria to satisfy operator preferences based on the operating characteristics (e.g., output rate, total power capacity) of the power sources. The power plant operator may employ a preference algorithm to specify different thresholds at different times and to update the thresholds in response to operating conditions and forecast events. For example, as the operator learns the resilience of the grid, a grid-draw threshold may be adjusted over time. In another example, in response to weather forecast data indicating low wind speeds for an extended period of time, the operator may adjust the threshold used to prioritize various power sources.

The power plant operator can generally categorize the power systems used to provide additional power (to offset or reduce the amount of power drawn from the grid 320 to power the ancillary systems) into three categories: ESS 314; fueled generators (e.g., diesel, natural gas, biomass, etc., generators); and non-fueled generators (e.g., solar panels, hydro turbines, geothermal pumps). The power plant operator can prioritize different additional power sources to use in different circumstances based on the stability and performance characteristics of the various systems (e.g., run time, operating costs, safety levels, start/stop response times). Accordingly, a first power plant operator may prioritize which power sources to use differently than a second power plant operator faced with the same ancillary power demand. For example, the first power plant operator may run a diesel generator to provide the base ancillary power demand (e.g., up to X kW) and an ESS 314 to provide the base ancillary power demand beyond the diesel generator's capacity (e.g., from X kW to Y kW). In contrast, the second power plant operator may control an ESS 314 generator to provide the base ancillary power demand (e.g., up to X kW) and diesel generator to provide the base ancillary power demand beyond the capacity of the ESS 314 (e.g., from X kW to Y kW).

Typically, a power plant controller may prioritize renewable or non-fueled power generators (e.g., solar, wind, hydro, geothermal generators), but may vary when to use power from an ESS 314 or a fueled generator. For example, when a battery (or other ESS 314) is set to a lower priority for use than a fueled generator, the battery is held in reserve to quickly respond to fluctuations in power demanded by the ancillary systems, which can increase the stability of the HPP 310 as a whole. However, when the fueled generator is set to a lower priority for use than a battery (or other ESS 314), the power plant controller may conserve fuel. A power plant controller may also prioritize which alternative power source to use at a given time based on differing startup delays of those power sources. For example, the startup threshold of a fueled generator may be longer than that of an ESS 314, and therefore the startup threshold for the generator can be based on how long that generator is expected to take to be brought online. In some aspects, due to an ESS 314 having a short startup time, the ESS discharge threshold can be set below the grid-draw threshold or the generator startup threshold so that the HPP 310 draws power from the ESS 314 before drawing power from the grid or the generator. In some aspects, the ESS discharge threshold and the generator startup threshold are set based on one another so that the HPP 310 draws power from the ESS 314 while waiting for the generator to come online, and can stop drawing power from the ESS 314 once the generator comes online. Additionally, the HPP 310 can draw power from the ESS 314 during a shutdown procedure for the generator or when the generator is operative, but the power consumption from the HPP 310 exceeds the power output by the generator.

At block 520, the power plant operator determines whether an ESS discharge threshold is satisfied. When the ESS discharge threshold is satisfied, method 500 proceeds to block 525, where the ESS 314 is discharged to provide power internally to the HPP 310 and the powered systems therein. When the ESS discharge threshold is not satisfied, method 500 proceeds to block 530.

The ESS discharge threshold may be set differently by different operators of HPPs 310 to account for different operating parameters/preferences, sizes/capacities of the ESS 314 in the HPP 310, charge levels in the ESS 314, and reserve capacity levels for the ESS 314. For example, a power plant operator may deploy an ESS 314 that is constrained (by software or physical characteristics) to output no more than a given peak power level or a total amount of power within a given period of time. In another example, an operator may specify that while the HPP 310 is connected to the grid 320, that the ESS 314 is to maintain a minimum SoC in case of the HPP 310 becoming disconnected from the grid 320 and requiring a reserve of power (e.g., a ride through amount of power or black start amount of power). In another example, the power plant operator may reserve a given amount of charge in an ESS 314 or fuel for a fueled generator to provide for active power injection to regulate a frequency response of the HPP 310 relative to the grid 320.

At block 530, the power plant operator determines whether a generator startup threshold is satisfied. When the generator startup threshold is satisfied, method 500 proceeds to block 535, where the auxiliary generator 315 is activated to provide power internally to the HPP 310 and the powered systems therein. When the generator startup threshold is not satisfied, method 500 proceeds to block 540.

Because an auxiliary generator 315 may require a period of time to startup and reach a specified output capacity, the operator may set the generator startup threshold so that auxiliary generators 315 are activated before the power demand curve 610 reaches the peak output rate of the auxiliary generator 315. Similarly, an operator may set the generator startup threshold (or a deactivation threshold) to allow an auxiliary generator 315 to remain active after the power demand curve 610 drops below the peak output rate of the auxiliary generator 315 (e.g., in anticipation of later power demands being higher). Additionally, an operator may set a deactivation threshold for an auxiliary generator 315 for when to deactivate or shut down the auxiliary generator 315 based on the startup delay and/or predicted demands for power. For example, a deactivation threshold may be set to keep the auxiliary generator 315 actively producing power in anticipation of higher future demand thereby reduce the need to deactivate/reactive the auxiliary generator 315 in rapid succession or to otherwise rely on the grid 320 or the ESS 314 to provide power while waiting for the auxiliary generator 315 to reactivate. In some embodiments, excess power from the auxiliary generators 315 may be supplied to the grid 320 or may be used to charge the ESS 314 in the HPP 310.

At block 540, the power plant operator determines whether a SoC threshold is satisfied. When the SoC threshold is satisfied, method 500 proceeds to block 545, where the ESS 314 is charged. When the SoC threshold is not satisfied, method 500 proceeds to block 550.

In various embodiments, the SoC threshold indicates the conditions under which the ESS 314 is to be charged while power for the powered systems is provided from the auxiliary generator 315 and/or the grid 320. The SoC threshold may specify a charge level in an ESS 314 that indicates when, and to what charge level, excess power from an auxiliary generator 315 is to be used to recharge an ESS 314, and when, and to what charge level, additional power from the grid 320 is to be drawn by the ESS 314. For example, to avoid a peak grid-draw value above a specified value, an ESS 314 may be used to supplement an auxiliary generator 315 in meeting the power demands of the powered systems, but requires sufficient charge to be able to provide that power. Accordingly, an ESS 314 may be pre-charged in anticipation of a high peak power demand to have sufficient power available for discharge so a lower peak draw from the grid 320 is needed at a later time to power the powered system and thus reduce the adverse effects on other loads 340 connected to the grid 320 of high peak draws from the powered systems.

The ESS 314 can be charged in various situations from various sources according to the SoC threshold and charging logic implemented by the power plant operator. In some embodiments, the ESS 314 is charged from the WTG 100 to avoid energy curtailment, such as when curtailment frequently occurs. In some embodiments, the ESS 314 is charged from the grid 320 in anticipation of imminent discharge (e.g., a predicted discharge within the next m minutes) or constantly charging/discharging to even out fluctuations in energy consumption and prediction confidence is low. In other embodiments, the ESS 314 is charged from the generator (e.g., a fueled or non-fueled generator) to even out fluctuations in energy consumption when prediction confidence is low.

At block 550, the operator draws, from the grid 320, the difference in power between the demands of the powered systems (determined per block 510) and the demands of charging the ESS 314 (per block 545) versus the power supplied from discharging the ESS (per block 525) and supplied once the auxiliary generator 315 is activated (per block 535). Method 500 may then conclude.

Figure 7:
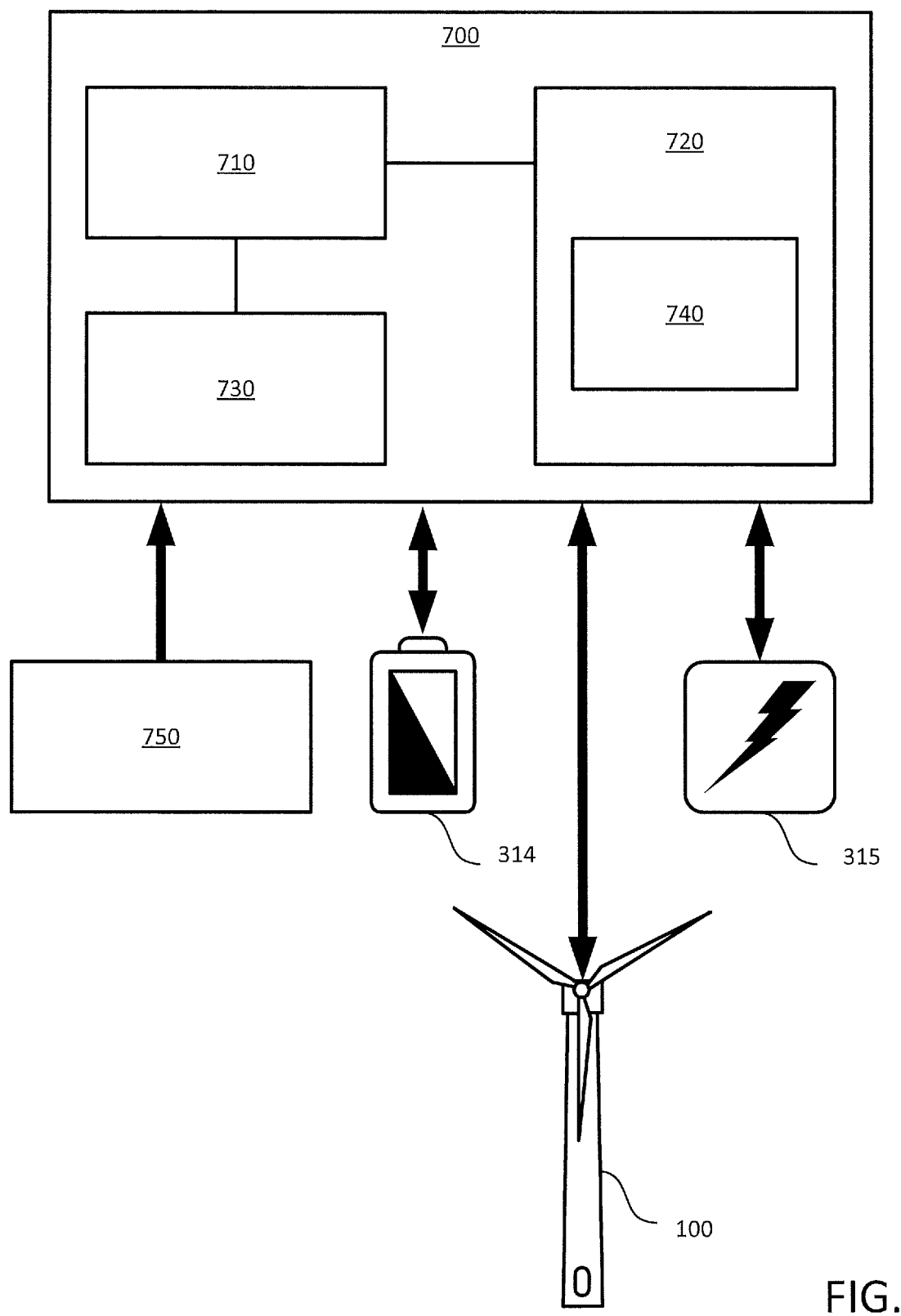
FIG. 7 is a block diagram of a controller unit, according to one or more embodiments of the present disclosure.

FIG. 7 is a block diagram of a controller unit 700 as may be used in one or more of a WTG 100 or a HPP 310 to control several generator units and ESS 314 in a power plant, according to one or more embodiments. The controller unit 700 includes one or more computer processors 710 and a memory 720. The one or more processors 710 represent any number of processing elements that each can include any number of processing cores. The memory 720 can include volatile memory elements (such as random access memory), non-volatile memory elements (such as solid-state, magnetic, optical, or Flash-based storage), and combinations thereof. Moreover, the memory 720 can be distributed across different mediums (e.g., network storage or external hard drives).

As shown, the one or more processors 710 are communicatively coupled with a communication system 730 to send/receive communication via fiber optic cables, electrical wires, and/or radio signals with various sensors 750 and other controller units 700 associated with the WTGs 100, ESS 314, and auxiliary generators 315. In some embodiments, the various sensors 750 are linked to the generator units under the control of the controller unit 700. In other embodiments, the various sensors 750 are independent from the generator units under the control of the controller unit 700. For example, a controller unit 700 in control of several fueled auxiliary generators 315 may send setpoints to the various pumps of those auxiliary generators 315 (e.g., fuel pumps) and receive sensor data from various voltage/current level, temperature, and fuel level sensors associated with those auxiliary generators 315, but may also receive sensor data from sensors 750 associated with WTGs 100 and other powered systems not under the control of the controller unit 700 and sensors not associated with a generator unit.

The memory 720 may include a plurality of "modules" for performing various functions described herein. In one embodiment, each module includes program code that is executable by one or more of the processors 710. However, other embodiments may include modules that are partially or fully implemented in hardware (i.e., circuitry) or firmware. The memory 720 includes an auxiliary control logic 740 that enables the controller unit 700 to optimize the setpoints at which the various generator units and ESS 314 in communication with the controller unit 700 operate to provide power for the various powered systems in a NPP 310. In some embodiments, the auxiliary control logic 740 is pre-loaded with setpoints for various control schemes that prioritize the use of the grid 320, ESS 314, or auxiliary generator 315 in various situations, such as are described in relation to FIGS. 4, 5, and 6A-6D by way of example.

In the preceding, reference is made to embodiments presented in this disclosure. However, the scope of the present disclosure is not limited to specific described embodiments. Instead, any combination of the features and elements provided above, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

The present invention may be a system, a method, and/or a computer program product. The computer program product may include a computer-readable storage medium (or media) (e.g., a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing) having computer readable program instructions thereon for causing a processor to carry out aspects of the present invention.

Aspects of the present disclosure are described with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

What is claimed is:

1. A hybrid power plant, comprising:
a plurality of wind turbine generators, wherein each wind turbine generator includes an ancillary system that consumes power for operation, wherein a power consumption of the hybrid power plant varies over time and includes a peak consumption value;
at least one alternative power source selected from:
an Energy Storage System (ESS); and
an auxiliary generator;
a point of common coupling with an external power grid by which power can be injected into the external power grid or drawn from the external power grid by the hybrid power plant; and
a controller unit, in communication with the plurality of wind turbine generators, the at least one alternative power source, and the point of common coupling, configured to:
determine a power drawn by the hybrid power plant;
determine one or more of:
a state of charge of the ESS; and
an auxiliary generator production capacity;
control the at least one alternative power source to provide additional power to keep the power drawn from the external power grid below a grid-draw threshold, thereby limiting an amount of power drawn from the external power grid at peak consumption; and
adjust the grid-draw threshold based on a highest prior experienced peak consumption value measured within a predefined time window.

2. The hybrid power plant of claim 1, wherein the at least one alternative power source includes the ESS and the auxiliary generator, and wherein the controller unit is further configured to:
control at least one of the ESS and the auxiliary generator to provide additional power based on a preference algorithm, wherein the preference algorithm sets an ESS discharge threshold based on a first level of the power consumption for when to control the ESS to provide additional power, and wherein the preference algorithm sets a generator startup threshold based on a second level of the power consumption for when to start up the auxiliary generator.

3. The hybrid power plant of claim 2, wherein the generator startup threshold is set relative to a startup delay of the auxiliary generator.

4. The hybrid power plant of claim 1, wherein the at least one alternative power source includes the ESS and the auxiliary generator, and, wherein the controller unit is further configured to control the ESS to charge when at least one of:
power generated by the auxiliary generator exceeds the power consumption of the hybrid power plant; and
power drawn from the external power grid is below the grid-draw threshold for power drawn from the external power grid.

5. The hybrid power plant of claim 1, wherein the at least one alternative power source includes the ESS and the auxiliary generator, and wherein the controller unit is further configured to control the ESS to provide additional power during startup operations of the auxiliary generator and control the ESS to stop providing additional power once the auxiliary generator is active and power output of the auxiliary generator exceeds the power needed to keep the power drawn from the external power grid below the grid-draw threshold.

6. The hybrid power plant of claim 1, wherein the controller unit is further configured to control the ESS to maintain the state of charge above a predefined level while the hybrid power plant injects power into the external power grid.

7. The hybrid power plant of claim 1, wherein the controller unit is further configured to control the auxiliary generator to maintain a minimum fuel level above a predefined level while the hybrid power plant injects power into the external power grid.

8. The hybrid power plant of claim 1, wherein the grid-draw threshold is set based on a predicted power consumption for the ancillary system.

9. The hybrid power plant of claim 1, wherein the grid-draw threshold is determined based on a forecasted power draw from the external power grid by the hybrid power plant.

10. The hybrid power plant of claim 1, wherein the controller unit is further configured to minimize a power amount drawn from grid.

11. A method, comprising:
determining, for a hybrid power plant, a grid-draw threshold from an external power grid;
monitoring power consumption for powered systems of the hybrid power plant;
monitoring power generation of the hybrid power plant;
discharging an alternative power source of one or more of an Energy Storage System (ESS) and an auxiliary generator in response to the power consumption exceeding the grid-draw threshold;
implementing prediction algorithms for power generation of the hybrid power plant and the power consumption; and
adjusting the grid-draw threshold based on a highest peak consumption value measured within a predefined time window.

12. The method of claim 11, further comprising:
resetting the grid-draw threshold to an initial value after the predefined time window; and
readjusting the grid-draw threshold based on a subsequent highest peak consumption value measured within a subsequent predefined time window.

13. The method of claim 11, wherein controlling the alternative power source is done in further response to a wind generated power level falling below the power consumption.

14. The method of claim 11, further comprising:
in response to reaching a generation threshold, stopping discharge of the alternative power source, wherein the generation threshold includes:
a total power supplied from the ESS from an initial state of charge since activation;
a total power supplied from the auxiliary generator from an initial fuel level since activation; and
a power output from wind turbine generators of the hybrid power plant.

15. The method of claim 11, wherein the grid-draw threshold is based on a load sensitivity for a different load connected to the external power grid.

* * * * *